Patented Feb. 16, 1943

2,311,228

UNITED STATES PATENT OFFICE 2,311,228

BAUXITE CERAMIC AND METHOD OF MAKING SAME

John Allen Heany, New Haven, Conn., assignor to Heany Industrial Ceramic Corporation, Rochester, N. Y.

No Drawing. Application June 29, 1936, Serial No. 87,826

6 Claims. (Cl. 106—65)

The present invention relates to making ceramic materials for bauxite, and it particularly relates to processes of preparing hard, dense, vitreous-like and amorphous refractories from dehydrated mineral bauxite at ceramic firing temperatures.

Although bauxite is readily available in large quantities, considerable difficulty has been experienced in forming suitable ceramic materials which may be utilized for abrasives, refractory bricks, crucibles, pipe stems, nozzle tips, and so forth, and it has usually been necessary to resort to fusion processes, which not only necessitate the use of electric furnace equipment, but in addition result in the formation of crystalline productions which have different cleavage planes and which are not suitable for many purposes. Moreover, if the usual ceramic methods are applied to the production of articles from bauxite it is found that the final ceramic material are usually not vitreous-like, do not appear to be homogeneous, and often are quite porous.

It is among the objects of the present invention to produce ceramic articles from natural mineral bauxite which are hard, amorphous, dense, homogeneous, vitreous-like, non-porous, and which may be readily and inexpensively manufactured by ordinary ceramic firing processes without the necessity of resorting to expensive fusion processes.

Other objects will become obvious from consideration of the following specification.

According to the present invention it has been found possible to produce hard, vitreous-like, homogeneous, non-porous and amorphous ceramic articles, useful for many purposes, by heating dehydrated bauxite which has been finely ground and formed at a temperature of between 1000° C. and 1500° C. in the presence of relatively small quantities of water-soluble alkali metal compounds, preferably alkali metal oxide compounds, such as sodium or potassium nitrates or borates, excluding preferably the insoluble alkali metal silicates such as feldspar, and so forth.

The alkali metal compound, and preferably the alkali metal oxide compound, should be utilized in proportions of substantially less than 5%, and preferably less than 3%, the most suitable proportion in many cases having been found to be less than 1%. The use of less than 1% of alkali metal compound appears to produce articles of increased hardness. The alkali metal compound or oxide does not seem to function as a flux or binding agent but its function appears to accelerate the formation of a vitreous alumina at a relatively low firing temperature of 1000° C. to 1400° C., substantially below the fusion point of alumina. These alkali metal compounds also appear to function as ceramic or vitrification catalysts to counteract the negative effect of the iron, titanium and silicon oxides present in the bauxite.

The firing treatment should be so controlled, as to temperature and time, that the bauxite fully retains its amorphous character in its final ceramic form.

Before firing it is usually preferable to drive off the water and volatile matter in the bauxite, although in some instances several percent of water in combined condition may be left in the bauxite. This may be accomplished by heating the bauxite to about 500° C. to 600° C., which is about a red heat. By maintaining a dehydration temperature above 400° C. and not more than 600° C., the plasticity of the bauxite is maintained and the possibility of the formation of abrasive particles is avoided. In some instances the dehydration temperature may be increased to between 950° C. and 1000° C., or reduced to 275° C. to 300° C., or to intermediate temperatures, but considerable care must be taken, however, to maintain the bauxite in its plastic, amorphous condition without formation of hard sintered masses at higher temperatures, or imperfectly dehydrated materials at lower temperatures.

The bauxite, before and/or after dehydration at 500° C. to 600° C., or at higher or lower temperatures as above specified, may be ground or distintegrated to a fine powder. The grinding is preferably performed after the dehydration until the bauxite reaches a fineness of at least 250 mesh.

Many different types of hydrous alumina or bauxite may be employed. The following are examples of two representative bauxites which are found in the United States and which may be used:

| | Alabama | Arkansas |
|---|---|---|
| | Per cent | Per cent |
| $Al_2O_3$ | 57 | 58 |
| $Fe_2O_3$ | ½ | 4 |
| $SiO_2$ | 11 to 12 | 5 to 6 |
| $TiO_2$ | 2.5 to 3 | 3 to 3½ |
| Ignition loss | 29 to 30 | 30 |

It is generally desirable to select bauxites having a silica content of about 5% when relatively hard ceramic articles are to be produced for use in abrasives, drawing dies, and so forth. Bauxites of higher silica content may be employed where softer ceramics are desired.

The dehydrated, amorphous bauxite may then be mixed with water and the alkali metal compound, or preferably with a concentrated solution, suspension or slurry of the alkali metal compound, to form a mixture which, after filtration, may be formed into articles and then fired to a temperature below the fusion point of bauxite or aluminum oxide—preferably to a bright yellow heat or to a temperature ranging from 1000° C. to 1600° C., or more desirably, from 1350° C. to 1450° C. This temperature is maintained until the finely divided material has conglomerated to form a dense, hard, non-porous and vitreous-like mass, which is amorphous and devoid of cleavage planes, and which has a conchoidal fracture.

Although sodium or potassium nitrate or borate are preferred forms of the alkali metal compounds, it is also possible to incorporate other alkali metal compounds, preferably of water-soluble nature, with the finely powdered dehydrated bauxite or alumina, suitable alkali metal compounds being sodium or potassium oxides, hydrides, nitrites, chlorides or other halides, sulphates and carbonates.

In some cases where it is desired to obtain a relatively soft refractory, the alkali metal compound may be used in the form of a soluble silicate, but at all times insoluble silicates such as clay and feldspar should preferably be excluded unless they are included in such small quantities as not to serve as bonding agents.

The alkali metal compound, particularly when it is utilized in proportions less than 5%, or less than 2%, appears to function most satisfactorily as a vitrification catalyst in overcoming the negative effect of the titanium, silicon and iron oxides which seem to retard production of a satisfactory ceramic material. The alkali metal compound may be satisfactorily used in amounts even as small as 0.01% to 0.1%.

Where the alkali metal compound is combined with the dehydrated bauxite in the wet, it is desirable to dehydrate the bauxite after incorporation of the alkali metal compound, either before or after the forming and molding of it, to drive off the water. In the preferred procedure, the moisture is reduced to 5% to 15% by filterpressing and then, after pugging, forming and/or molding, the mixture is dried to less than 1% uncombined moisture.

Where there are substantial amounts of volatile salts such as the carbonates, sulphates, nitrates or nitrites, it is also sometimes desirable to first heat the dried, formed or molded material to a temperature below the final firing temperature to decrease any possible shrinkage or formation of bubbles or gases during the final firing operation. To enhance the quality of the final ceramic, it is also desirable that the dehydrated bauxite compound with the alkali metal compound be pugged with water in such a manner as by application of vacuum or pressure to draw substantially all the air and gases out of the mixture.

It is to be understood that the dehydrated and finely divided alumina may also be combined with the catalyst by grinding it in dry condition with the alkali metal compound, or during the pugging process, but wet incorporation by grinding the dehydrated bauxite with the alkali metal compound in aqueous solution has been found to be most satisfactory and eliminates undesirable creation of static electrical charges.

If desired, some of the catalytic material may also be added to the initial bauxite before dehydration between 300° C. and 1000° C., and this may be done incidental to a wet or dry grinding of the bauxite before this initial dehydration. It has also been found desirable in many instances where an alkali metal compound is to be added, to add the catalyst in two stages, part of the catalyst being added by wet or dry grinding before or after firing, and the remainder of the catalyst being added with continued grinding or during pugging.

It is also possible to add part or all of the catalytic alkali metal compound to the alumina material after it has been fired to a relatively elevated temperature. For example, the alumina material may have been fired first for short periods of time at a temperature of 1000° C. to 1200° C., or even up to a temperature of 1400° to 1600° C. before the addition of an alkali metal compound. This firing treatment, however, should be insufficient to cause vitrification. The ceramic materials so formed may then be ground wet or dry and combined in one or several steps with the catalytic material, following which the mass may be formed to the desired shapes and fired at a temperature of 1400° C. to 1600° C. until the desired ceramic quality is obtained.

As an alternative method of incorporating a catalytic reagent, the dehydrated alumina article may be formed and heated sufficiently so that it will hold its shape, as for example, by firing it to a temperature of 1000° C. to 1300° C. or higher. This article may then be dipped into an aqueous or non-aqueous solution or suspension of the alkali metal compound, or such suspension or solution may be sprayed upon the aluminous ceramic.

The following are some examples of the different proportions which may be employed and of the results corresponding thereto:

1. A mixture of 99% dehydrated Arkansas bauxite and 1% potassium nitrate will give a ceramic hardness test of Rockwell 68C.

2. A mixture of 98% dehydrated bauxite and 2% of sodium borate ($Na_2B_4O_7$) will give a Rockwell test of 65½C.

Other examples giving ceramics of suitable hardness are:

1. A mixture of 98% dehydrated Arkansas or Alabama bauxite and 2% of sodium carbonate.

2. A mixture of 99½% dehydrated Arkansas or Alabama bauxite and ½% of potassium hydroxide.

3. A mixture of 99% dehydrated bauxite and 1% of sodium sulphate.

In these examples, the alkali metal compounds were incorporated with the bauxite by wet grinding or during pugging, after dehydration at 300° C. to 1000° C., and the firing was then carried out at 1450° C. to 1500° C. for three to five hours.

By using the method of preparing aluminous ceramics in accordance with the present invention, it is possible to avoid the use of the electric arc furnaces, which produce a fused and crystalline ingot or mass which then must be ground, mixed with bonding materials such as clay, formed into the shape of the article and finally fired in a kiln. In the present process the natural bauxite may be directly formed into the ceramic article in standard fuel-fired furnaces or kilns, as now used in firing porcelain or other ceramics, at temperatures below the fusion point of bauxite. As a result, the ceramics of the present application may be produced at low cost with large unit production, and the alumina is amorphous rather than in a crystalline condition.

Moreover, the alumina, being relatively pure and devoid of bonding clays, is very dense and vitreous, and it has been found that the density increases with the fineness of the grinding of the initial alumina material before or after dehydration. The shrinkage of the ceramic is very slight so that the articles may be directly formed in the final shape.

If desired, however, the pugged material may be fired in the form of small pieces, after thorough drying, for several hours at 1350° C. to 1500° C., then ground, sifted and molded or formed, with or without the addition of water, and finally fired to form the final ceramic.

The final ceramic materials produced may be utilized for stoneware, refractory bricks, abrasives, nozzles for sand blasting, dies for wire drawing, crucibles, refractory vessels, translucent panels, pyrometer tubes, dies, furnace linings, muffles, combustion tubes, tiles, combustion boats, pebbles for pebble mills, non-slip treads, mortars and pestles, casseroles, spatulas, hearth plates, saggers, jaws for crushing apparatus, drills, chemical stoneware, pottery, textile guides, electric furnace cores, bearings for clocks and instruments, linings for ball and pebble mills, and so forth.

It is an essential feature of the present invention that a natural dehydrated bauxite, with its normal content of iron oxide, titanium oxide and silicon oxide, and with the addition of vitrification catalysts such as an alkali metal compound in amounts varying from 0.1% to 2%, be fired at a temperature of 1300° C. to 1500° C. to produce a ceramic. If desired, it may also be possible to incorporate purified alumina or bauxite devoid of iron, titanium and silicon oxides, in amounts varying from 10% to 50% or more with the normal bauxite, before or after heating to a temperature of 300° C. to 1000° C., or preferably 500° C. to 600° C.

It is most desirable in the present invention that the bauxite be submitted to two distinct heating processes, one of dehydration at between 300° C. to 1000° C., or preferably about 500° C. to 600° C., and a second of calcination or firing at a bright yellow heat ranging from 1300° C. to 1600° C., with an intermediate ceramic grinding and forming or molding operation. It is most important, also, during this entire procedure that the amorphous character of the alumina be maintained with suitable control of time and temperature. Moreovber, the temperature should not be more than 1600° C. in the final step, inasmuch as an increased temperature often produces blistering and gas pockets, decreasing the homogeneous and dense character of the refractory. When dehydrated according to the present invention, the bauxite preserves its plasticity whereby it can be worked and formed and pugged with water the same as a plastic clay and without the use of a temporary binder.

The firing operation may be carried out in an oxidizing atmosphere containing air, in a neutral atmosphere containing waste combustion gases, or in a reducing atmosphere containing substantial quantities of hydrogen and carbon monoxide or other reducing gases. Firing in an oxidizing atmosphere gives an increased hardness as compared to firing in a reducing atmosphere, and the same is true as to firing in a reducing atmosphere as compared to firing in a neutral atmosphere.

If desired, the final firing operation at 1300° C. to 1600° C. may be performed under such circumstances that the iron in the alumina may be converted into a suitable oxide to give a black or reddish color to the ceramic. These color effects may also be obtained by incorporating vanadium, chromium or manganese compounds in the bauxite before or after dehydration, these compounds being ground with the bauxite at the same time as the catalysts, but in amounts never exceeding a few percent.

To describe a typical method of producing the ceramic, the raw bauxite in its natural conglomerated or pisolitic condition is first fed into a revolving or rotary kiln or furnace, for example, of the "Ruggles-Cole" type. During the passage through this furnace the bauxite is maintained at temperatures ranging from 525° C. to 600° C. for several hours and is thus dehydrated. After removal from the outlet of the furnace the dehydrated bauxite is ground in a pebble mill with flint pebbles, or in a ball or tube mill, with the addition of 10% of a 20% solution of potassium nitrate. After grinding, the material is pressed through a filter press where the slurry or liquid mass is partly dehydrated, and as a result a filter cake of dehydrated bauxite combined with the vitrifying catalyst is obtained containing about 4% to 10% of water. The filter cake is then inserted in a pug mill which may be provided with knives to cut up the filter cake, and finally the material is picked up by an auger or Archimedes screw which presses out the material through dies to form sheets or cylinders. The extruded mass preferably has the consistency of a thick dough, and is termed a wad or stiff mud. The extruded mass may also be pressed into a die or formed in a forming machine or in a jigger lathe or other fashion to produce articles as above described. These formed articles may then be fired at a temperature of 1300° C. to 1500° C. for three to five hours.

The pug mills may be of the types manufactured by the Ceramic Machine Company, or of the type known as the F-R-H vacuum pottery pug mill, manufactured by the Fate-Root-Heath Company of Plymouth, Ohio. In these pug mills, pressure and vacuum may be applied to draw out the air from the mass so that the extruded substance is substantially devoid of the air and gas bubbles. This will result in a denser and more homogeneous aluminous ceramic.

By the expression "alkali metal compound" is included potassium and sodium compounds, of which the oxide or oxygen compounds such as the nitrates, borates, oxides or the hydroxides are preferred. Those compounds which readily decompose with the production of a volatile oxide and an oxide of potassium or sodium are next preferred, such as the carbonates, nitrites and various organic compounds such as the acetates. Less preferred are the halides such as the chlorides and sulphates. The silicates are preferably excluded. These compounds are generally included under the expression "vitrifying catalysts."

The production of the ceramics from pure alumina substantially devoid of titanium, silicon and iron oxides, is described in my co-pending application Serial No. 135,369, filed April 7, 1937, now Patent No. 2,278,442, issued April 7, 1942; from bauxite without a vitrifying catalyst in co-pending application Serial No. 87,824, filed June 29, 1936; and from bauxite with magnesium compounds as vitrifying catalysts in co-pending application Serial No. 87,825, filed June 29, 1936.

It is apparent that many changes could be effected in the processes and procedures above described, and in the specific details thereof, without substantially departing from the invention intended to be defined in the claims, the specific description herein merely serving to illustrate certain elements by which, in one embodiment, the spirit of the invention may be effectuated.

What I desire to claim is:

1. A vitreous-like, dense, non-porous, hard, amorphous, unfused and ignited bauxite containing a small amount of an alkali metal compound, possessing a conchoidal fracture and a hardness of approximately 74C–76C on the Rockwell scale hardness testing machine, said bauxite having been dehydrated before forming and firing at a temperature substantially below 1000° C.

2. The process of forming a substantially vitrified, amorphous, hard, dense, non-porous, non-fused, fired bauxite ceramic containing a vitrification catalyst, which comprises calcining and igniting bauxite at a temperature of between 500° C. and 600° C. to dehydrate it without modifying its amorphous character, wet grinding a small percentage of an alkali metal compound with the dehydrated bauxite, compressing said mixture into the form of an article desired, and heating said article to a temperature above 1000° C. and below the fusing point of the mixture.

3. A process of making a vitreous-like, amorphous, hard, unfused bauxite consisting in calcining and igniting bauxite at a temperature of between 500° C. and 600° C. to dehydrate it without modifying its amorphous character, wet grinding and compounding a small percentage of an alkali metal compound with an ignited bauxite, forming to shape under pressure to render the same dense, and firing said dense shape at temperatures below the fusing point of the bauxite.

4. The process of making a vitreous-like bauxite consisting in calcining and igniting bauxite at a temperature of between 500° C. and 600° C. to dehydrate it without modifying its amorphous character, thoroughly incorporating and wet grinding a small percentage of an alkali metal compound with the ignited bauxite, rendering the mixture dense by pressure into any desirable shape, and firing said dense shape to a temperature of approximately 1300° C. to 1450° C.

5. The method of producing a dense, vitreous-like, amorphous, non-porous bauxite article comprising calcining and igniting bauxite at a temperature of between 500° C. and 600° C. to dehydrate it without modifying its amorphous character, mixing the ignited bauxite with a water soluble alkali metal compound, which has the property of being decomposed by heat and forming an alkali metal oxide, wet grinding, forming the mixture into an article, and firing said article in a fuel furnace or kiln.

6. A process of making ceramics from natural mineral bauxite which comprises passing pisolitic bauxite through a rotary kiln at temperatures of 500° C. to 600° C. to drive off most of the volatiles, grinding with an aqueous solution of an alkali metal compound, filtering, pugging, and simultaneously removing the air in the mixture, forming, and firing at 1000° C. to 1600° C. for three to five hours.

JOHN ALLEN HEANY.